(12) United States Patent
Eo et al.

(10) Patent No.: US 9,850,983 B2
(45) Date of Patent: Dec. 26, 2017

(54) TRANSMISSION FOR VEHICLE

(71) Applicant: Hyundai Motor Company, Seoul (KR)

(72) Inventors: Soon Ki Eo, Ansan-si (KR); Chon Ok Kim, Yongin-si (KR); Chae Hong Lim, Seoul (KR)

(73) Assignee: Hyundai Motor Company, Seoul (KR)

( * ) Notice: Subject to any disclaimer, the term of this patent is extended or adjusted under 35 U.S.C. 154(b) by 266 days.

(21) Appl. No.: 14/883,446

(22) Filed: Oct. 14, 2015

(65) Prior Publication Data

US 2016/0363187 A1     Dec. 15, 2016

(30) Foreign Application Priority Data

Jun. 11, 2015 (KR) ........................ 10-2015-0082503

(51) Int. Cl.
| | |
|---|---|
| *F16H 3/08* | (2006.01) |
| *F16H 3/093* | (2006.01) |
| *F16H 3/00* | (2006.01) |
| *F16H 3/097* | (2006.01) |
| *F16H 3/10* | (2006.01) |

(52) U.S. Cl.
CPC ............ *F16H 3/093* (2013.01); *F16H 3/006* (2013.01); *F16H 3/097* (2013.01); *F16H 3/10* (2013.01); *F16H 2003/007* (2013.01); *F16H 2200/0056* (2013.01)

(58) Field of Classification Search
CPC .............. F16H 3/006; F16H 2003/007; F16H 2003/008; F16H 3/10
USPC .................................. 74/330, 331, 333, 340
See application file for complete search history.

(56) References Cited

U.S. PATENT DOCUMENTS

| | | | | |
|---|---|---|---|---|
| 4,548,101 A | * | 10/1985 | Akashi .................... | F16H 3/006 74/330 |
| 4,622,866 A | * | 11/1986 | Ito ............................. | F16H 3/10 192/48.6 |
| 4,799,395 A | * | 1/1989 | Janiszewski ........... | B60K 17/26 192/219.2 |

(Continued)

FOREIGN PATENT DOCUMENTS

| | | |
|---|---|---|
| JP | 2005-195115 A | 7/2005 |
| KR | 10-2009-0132758 A | 12/2009 |

(Continued)

*Primary Examiner* — Ha D Ho
(74) *Attorney, Agent, or Firm* — Morgan, Lewis & Bockius LLP (57) ABSTRACT

A transmission for a vehicle may include a first input shaft continuously receiving torque from a power source and having a first input transfer gear thereon, a second input shaft selectively receiving torque from the power source through a clutch and having a second input transfer gear thereon, a coupling member allowing or restricting rotation of the first input transfer gear relative to the first input shaft, a first countershaft and a second countershaft each having an output transfer gear to be engaged with the first input transfer gear and the second input transfer gear, and coupling devices selectively coupling the output transfer gears to corresponding countershafts and allowing torque from the power source to be transmitted to a desired shift gear by coupling output transfer gears connected to the desired shift gear in the output transfer gears to a corresponding countershaft in advance or after synchronization in shifting.

13 Claims, 13 Drawing Sheets

(56) References Cited

U.S. PATENT DOCUMENTS

| | | | | |
|---|---|---|---|---|
| 5,186,065 A | * | 2/1993 | Downs | F16H 3/091 74/331 |
| 5,333,512 A | * | 8/1994 | Pruss | B60K 17/06 74/325 |
| 8,429,992 B2 | * | 4/2013 | Braford | F16H 3/006 74/331 |
| 8,801,556 B2 | * | 8/2014 | Kato | B60K 6/383 475/5 |

FOREIGN PATENT DOCUMENTS

| KR | 10-2010-0088731 A | 8/2010 |
|---|---|---|
| KR | 10-2013-0114815 A | 10/2013 |
| KR | 10-2013-0114816 A | 10/2013 |

* cited by examiner

TRANSMISSION FOR VEHICLE

CROSS REFERENCE TO RELATED APPLICATION

The present application claims priority to Korean Patent Application Number 10-2015-0082503 filed Jun. 11, 2015, the entire contents of which is incorporated herein for all purposes by this reference.

BACKGROUND OF THE INVENTION

Field of the Invention

The present invention relates to a transmission for a vehicle, and more particularly, to a transmission for a vehicle that improves deterioration of shifting ability such as backward pulling.

Description of Related Art

An automated manual transmission can provide convenience for a driver, similar to an automatic transmission, by providing an automatic shifting by means of an actuator while a vehicle is driven and can contribute to improving fuel efficiency of a vehicle while maintaining power transmission efficiency higher than an automatic transmission.

However, for an automated manual transmission based on a synchro-mesh type shifting mechanism, there is necessary a period where power from an engine is disconnected while automatic shifting is performed by an actuator that shifts gears, so torque is decreased and the shifting ability is deteriorated resulting in, for example, a backward pulling effect of the vehicle when shifting.

In order to solve these problems, a technology of selectively transmitting power from an engine to a shifting mechanism or an output shaft, depending on the driving states of a vehicle, by providing a planetary gear set between the engine and the shifting mechanism has been proposed.

Prior art technology requires two monitors to reduce deterioration of shifting ability, so the manufacturing cost and weight of a transmission increase.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for a vehicle that reduces deterioration of shifting ability, including a backward pulling effect when shifting.

According to various aspects of the present invention, a transmission for a vehicle may include a first input shaft continuously receiving torque from a power source and having a first input transfer gear thereon, a second input shaft selectively receiving torque from the power source through a clutch and having a second input transfer gear thereon, a coupling member allowing or restricting rotation of the first input transfer gear relative to the first input shaft, using a difference in rotational speed between the first input shaft and the first input transfer gear, a first countershaft and a second countershaft each having an output transfer gear to be engaged with the first input transfer gear and the second input transfer gear, and coupling devices selectively coupling the output transfer gears to corresponding countershafts and allowing torque from the power source to be transmitted to a desired shift gear by coupling output transfer gears connected to the desired shift gear in the output transfer gears to a corresponding countershaft in advance or after synchronization in shifting, in which the coupling devices are disposed between the output transfer gears.

The second input shaft may be a hollow shaft and the first input shaft may be inserted in the second input shaft.

The coupling member may be a one-way clutch.

The one-way clutch may be disposed between the first input transfer gear and the first input shaft.

The output transfer gears may include a first pre-mesh gear relatively rotatably disposed on the first countershaft and engaged with the second input transfer gear, a first synchro-mesh gear relatively rotatably disposed on the first countershaft and engaged with the first input transfer gear, a second pre-mesh gear relatively rotatably disposed on the second countershaft and engaged with the second input transfer gear, and a second synchro-mesh gear relatively rotatably disposed on the second countershaft and engaged with the first input transfer gear.

Gear ratios between the first and second input transfer gears and the output transfer gears on each of the countershafts may be the same.

The coupling devices may include a first coupling device selectively coupling the output transfer gears on the first countershaft to the first countershaft, and a second coupling device selectively coupling the output transfer gears on the second countershaft to the second countershaft.

The first coupling device and the second coupling device may be provided individually for the output transfer gears.

At least one of the first coupling device and the second coupling device may be disposed between the output transfer gears.

The transmission may, further include an output shaft disposed in parallel with the first countershaft and the second countershaft, and a shifting mechanism including a plurality of pairs of shift gears with different transmission gear ratios on the first countershaft, the second countershaft, and the output shaft, and configured to change and output torque from the power source through the output shaft by selecting pairs of gears corresponding to speeds of a vehicle, using a synchronizer.

The first input shaft, the second input shaft, and the output shaft may be coaxially arranged.

Input shift gears for odd-numbered ranges may be disposed on the first countershaft, remaining shift gears except for the input shift gears on the first countershaft are disposed on the second countershaft, and output shift gears that are paired with the input shift gears may be disposed on the output shaft.

A center coupling device for coupling may be disposed between the first input shaft and the output shaft.

The flow of torque transmitted through the first input transfer gear is smoothly changed to the desired pair of shift gears through the second input transfer gear by a relative rotation action allowed by the one-way clutch OWC in the process of shifting to the desired range, so deterioration of shifting ability for example, a backward pulling effect of a vehicle when shifting, is prevented.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A transmission for a vehicle according to various embodiments of the present invention may include largely a first input shaft INPUT1, a second input shaft INPUT2, a coupling member, a first countershaft CNT1, a second countershaft CNT2, and coupling devices.

Figure 1:
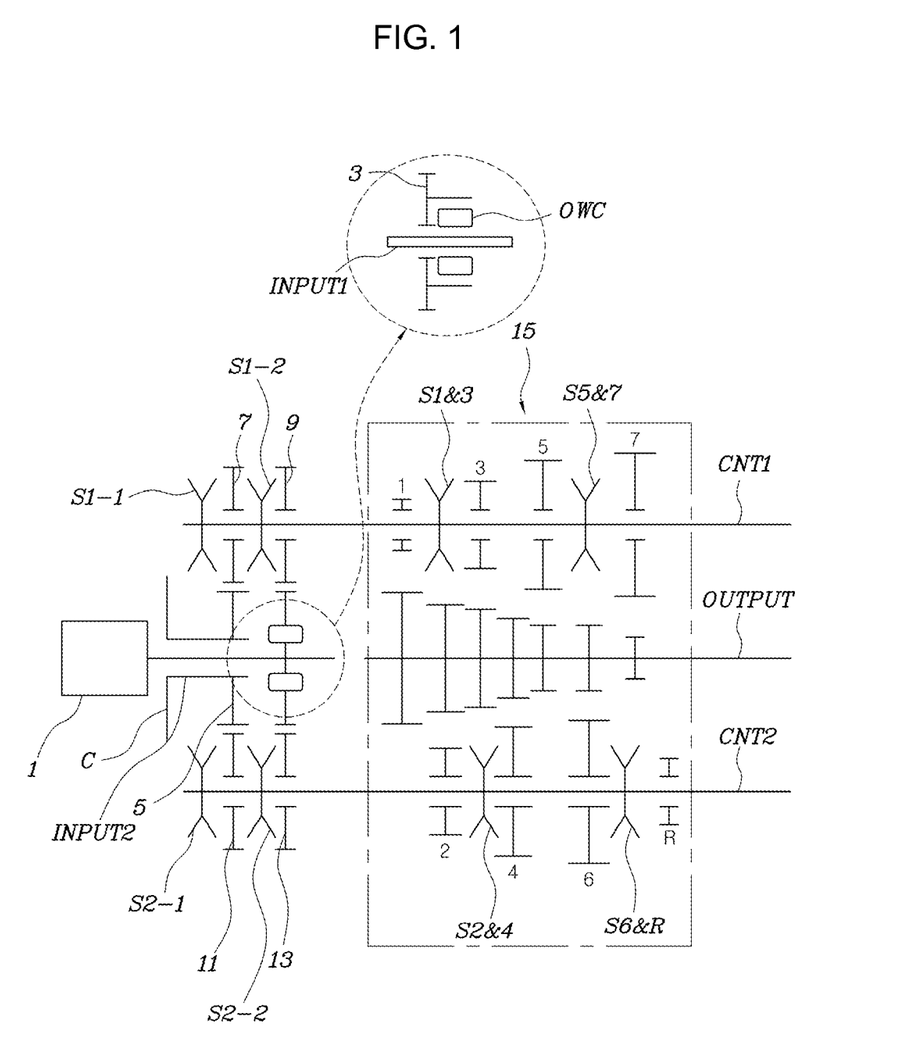
FIG. 1 is a diagram schematically showing the entire configuration of an exemplary transmission for a vehicle according to the present invention.

Referring to FIG. 1, in detail, the first input shaft INPUT1 is connected to a power source at a first end and continuously receives torque from the power source, and a first input transfer gear 3 may be fitted on a second end of the first input shaft INPUT1 to rotate with the first input shaft INPUT1. The power source may be an engine 1 and the first input shaft INPUT1 can continuously be rotated by torque from the engine 1.

The second input shaft INPUT2 is connected to the power source at a first end through a clutch C and selectively receives torque from the power source, depending on engagement and disengagement of the clutch C, and a second input transfer gear 5 is fitted on a second end of the second input shaft INPUT2 without relative rotation, so it can rotate with the second input shaft INPUT2.

For example, the first input shaft INPUT1 and the second input shaft INPUT2 may be coaxially arranged, in which the second input shaft INPUT2 may be a hollow shaft and the first input shaft INPUT2 may be inserted in the second input shaft INPUT2.

The coupling member, which allows or restricts rotation of the first input transfer gear 3 relative to the first input shaft INPUT1 due to a difference in relative speed between the first input shaft INPUT1 and the first input transfer gear 3, may be a one-way clutch OWC mechanically connecting or disconnecting power, but it may be a mechanical device operating in the same principle, a hydraulic part or a hydraulic-mechanical composite device, or a device using electric/electromagnetic force.

That is, the coupling member (hereafter, referred to as a 'one-way clutch') is disposed between the first input transfer gear 3 and the first input shaft INPUT1 and allows power to be transmitted only to the first countershaft CNT1 or the second countershaft CNT2 from the first input shaft INPUT1, while allowing relative rotation in the opposite direction.

For example, when the rotational speed of the first input shaft INPUT1 is higher than the rotational speed of the first input transfer gear 3, the first input shaft INPUT1 forcibly rotates the first input transfer gear 3. In contrast, when the rotational speed of the first input shaft INPUT1 is lower than the rotational speed of the first input transfer gear 3, the first input transfer gear 3 is rotated at a higher speed relative to the first input shaft INPUT1 by the one-way clutch OWC.

Two output transfer gears may be disposed on the first countershaft CNT1 to engage with the first input transfer gear 3 and the second input transfer gear 5, respectively, and similarly, two output transfer gears may be disposed on the second countershaft CNT2 to engage with the first input transfer gear 3 and the second input transfer gear 5.

The output transfer gears may include a first pre-mesh gear 7 and a first synchro-mesh gear 9 on the first countershaft CNT1 and a second pre-mesh gear 11 and a second synchro-mesh gear 13 on the second countershaft CNT2.

In detail, the first pre-mesh gear 7 may be relatively rotatably disposed on the first countershaft CNT1 and may continuously be in mesh with the second input transfer gear 5.

The first synchro-mesh gear 9 may be relatively rotatably disposed on the first countershaft CNT1 and may continuously be in mesh with the first input transfer gear 3.

The second pre-mesh gear 11 may be relatively rotatably disposed on the second countershaft CNT2 and may continuously be in mesh with the second input transfer gear 5.

The second synchro-mesh gear 13 may be relatively rotatably disposed on the second countershaft CNT2 and may continuously be in mesh with the first input transfer gear 3.

The gear ratios between the first and second input transfer gears 5 and the two output transfer gears on each of the countershafts may be the same.

For example, the gear ratios between the first input transfer gear 3 and the first synchro-mesh gear 9 and between the second input transfer gear 5 and the first pre-mesh gear 7 may be the same. Further, the gear ratios between the first input transfer gear 3 and the second synchro-mesh gear 13 and between the second input transfer gear 5 and the second pre-mesh gear 11 may be the same.

The gear ratios of the output transfer gears on the first counter shaft CNT1 and the output transfer gears on the second counter shaft CNT2 are the same, but may be different.

The coupling devices selectively couple the output transfer gears to the corresponding countershafts. For example, by the coupling devices, the output transfer gears on the first countershaft CNT1 are selectively coupled to the first countershaft CNT1 and the output transfer gears on the second countershaft CNT2 are selectively coupled to the second countershaft CNT2.

That is, by coupling output transfer gears connected to a desired shift gear in the output transfer gears to a corresponding countershaft in advance or after synchronization in shifting, torque from the power source can be transmitted to the desired shift gear from the current shift gear.

The coupling devices may include a first coupling device on the first countershaft CNT1 and a second coupling device on the second countershaft CNT2.

In detail, the first coupling device may selectively couple the output transfer gears on the first countershaft CNT1 to the first countershaft CNT1.

The second coupling device may selectively couple the output transfer gears on the second countershaft CNT2 to the second countershaft CNT2.

The first coupling device and the second coupling device may be provided for each of the output transfer gears and all types of coupling devices for connecting/disconnecting power, including a synchro-mesh type synchronizer, a dog clutch, a modified dog clutch, a wet/dry clutch, an electric/electronic wet/dry magnet clutch, a coupling, a fluid coupling, and a spline, may be used as the first and second coupling devices.

For example, the first coupling device may include a first-first coupling device S1-1 for coupling the first pre-mesh gear 7 to the first countershaft CNT1 and a first-second coupling device S1-2 for coupling the first synchro-mesh gear 9 to the first countershaft CNT1.

The second coupling device may include a second-first coupling device S2-1 for coupling the second pre-mesh gear 11 to the second countershaft CNT2 and a second-second coupling device S2-2 for coupling the second synchro-mesh gear 13 to the second countershaft CNT2.

The coupling devices may be disposed between the output transfer gears.

For example, as shown in FIG. 1, the first-second coupling device S1-2 may be disposed between the first pre-mesh gear 7 and the first synchro-mesh gear 9 and the second-second coupling device S2-2 may be disposed between the second pre-mesh gear 11 and the second synchro-mesh gear 13.

In this configuration, the first-first coupling device S1-1 may be disposed at a side from the first pre-mesh gear 7 to face the engine 1 and the second-first coupling device S2-1 may be disposed at a side from the second pre-mesh gear 11 to face the engine 1.

Figure 4:
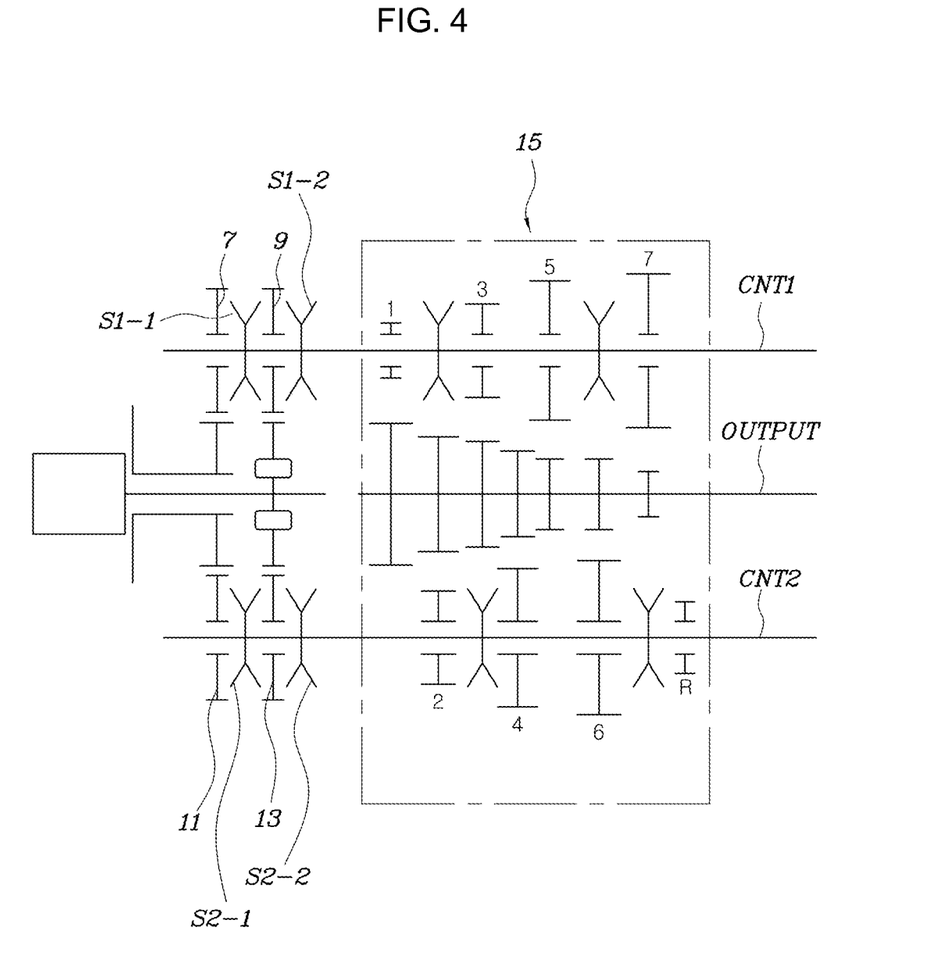
FIG. 4 is a diagram illustrating the entire configuration of an exemplary transmission for a vehicle having another arrangement of coupling devices according to the present invention.

As another example, as shown in FIG. 4, the first-first coupling device S1-1 may be disposed between the first pre-mesh gear 7 and the first synchro-mesh gear 9 and the second-first coupling device S2-1 may be disposed between the second pre-mesh gear 11 and the second synchro-mesh gear 13.

In this configuration, the first-second coupling device S1-2 may be disposed at a side from the first synchro-mesh gear 9 to face a shifting mechanism 15 and the second-second coupling device S2-2 may be disposed at a side from the second synchro-mesh gear 13 to face the shifting mechanism 15.

Figure 5:
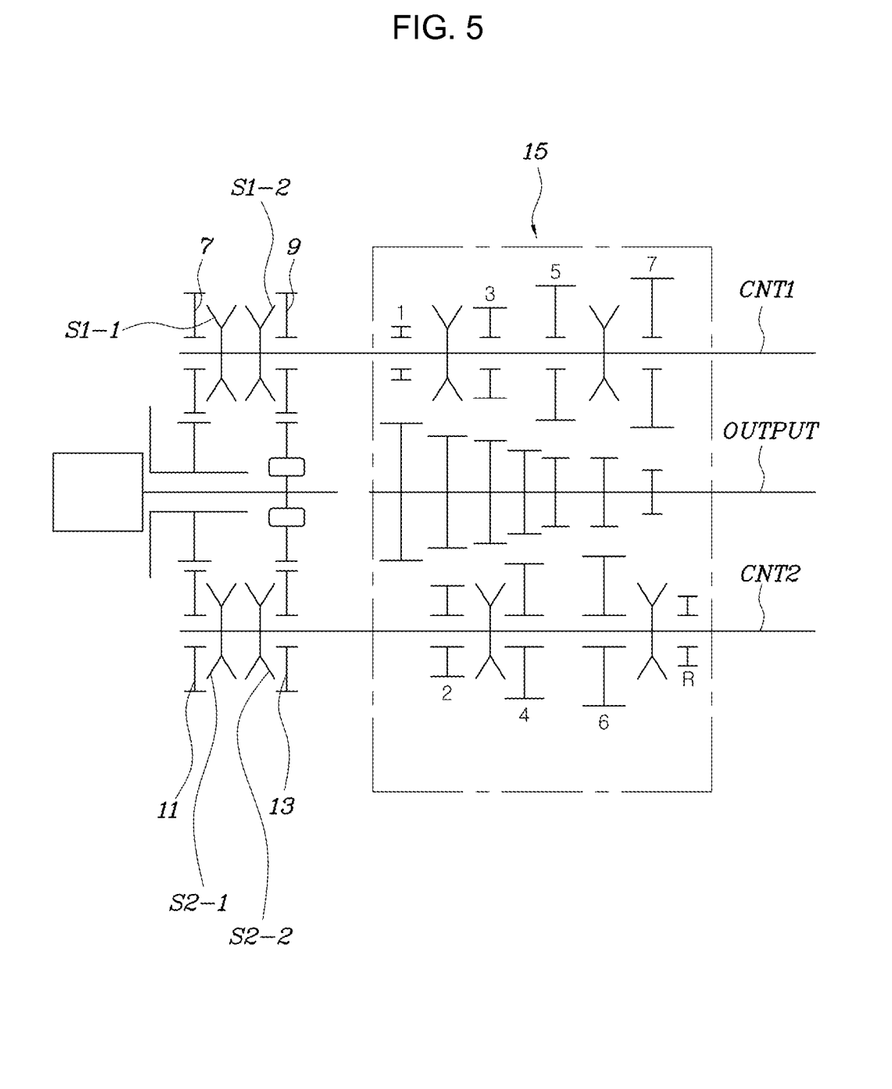
FIG. 5 is a diagram illustrating the entire configuration of an exemplary transmission for a vehicle having another arrangement of coupling devices according to the present invention.

As another example, as shown in FIG. 5, the first-first coupling device S1-1 and the first-second coupling device S1-2 may be disposed between the first pre-mesh gear 7 and the first synchro-mesh gear 9, and the second-first coupling device S2-1 and the second-second coupling device S2-2 may be disposed between the second pre-mesh gear 11 and the second synchro-mesh gear 13.

That is, since the output transfer gears are each provided with a coupling device for coupling them to corresponding countershafts, the time to be taken to engage/disengage two output transfer gears in shifting reduces, so the shifting time can be minimized.

The transmission for a vehicle according to various embodiments of the present invention may further include an output shaft OUTPUT and a shifting mechanism 15.

The output shaft OUTPUT may be disposed in parallel with the first countershaft CNT1 and the second countershaft CNT2. The output shaft OUTPUT may be arranged coaxially with the first input shaft INPUT1 and the second input shaft INPUT2.

Further, though not shown in the figures, output transmitted to the output shaft OUTPUT may be increased or decreased in speed through another pair of gears, a planetary gear set, or other transmission elements and then transmitted to wheels.

The shifting device 15 includes a plurality of pairs of shift gears with different transmission gear ratios on the first countershaft CNT1, the second countershaft CNT2, and the output shaft OUTPUT and can change and output torque from the power source through the output shaft OUTPUT by selecting pairs of gears corresponding to the speeds of a vehicle, using a synchronizer.

According to the arrangement of the shifting mechanism 15 of the present invention shown in FIG. 1, input shift gears for odd-numbered ranges may be disposed on the first countershaft CNT1 and other shift gears except for the input shift gears on the first countershaft CNT1 may be disposed on the second countershaft CNT2.

Output shift gears that are paired with the input shift gears may be disposed on the output shaft OUTPUT.

For example, when there are input shift gears for a 1-range, a 3-range, a 5-range, and a 7-range are on the first countershaft CNT1, input shift gears for a 2-range, a 4-range, a 6-range, and an R-range may be disposed on the second countershaft CNT2 and output shift gears may be disposed on the output shaft OUTPUT.

A 1 & 3-range synchronizer S1 & 3 may be disposed between the 1-range and 3-range input shift gears, a 5 & 7-range synchronizer S5 & 7 may be disposed between the 5-range and 7-range input shift gears, a 2& 4-range synchronizer S2 & 4 may be disposed between the 2-range and 4-range input shift gears, and a 6 & R-range synchronizer S6 & R may be disposed between the 6-range and R-range input shift gears.

Figure 6:
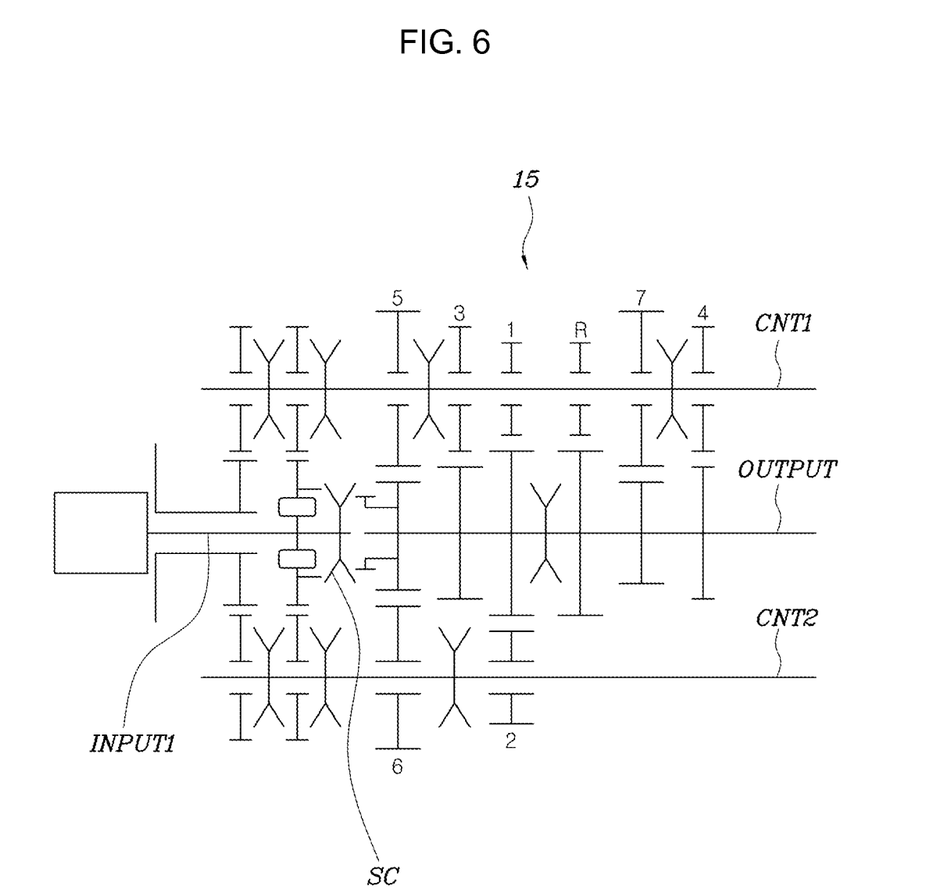
FIG. 6 is a diagram illustrating the entire configuration of an exemplary transmission for a vehicle having another arrangement of gears in a shifting device according to the present invention.

According to another arrangement of a shifting mechanism 15 shown in FIG. 15, the arrangement can be achieved by changing the arrangement of the shift gears of the shifting mechanism shown in FIG. 1.

For example, not only odd-numbered-range input shift gears, but some (R-range and 4-range) of even-numbered-range input shift gears may be disposed on the first countershaft CNT1 and the synchronizers on the first countershaft CNT1 or the second countershaft CNT2 may be moved to the output shaft OUTPUT.

In particular, a center coupling device SC for coupling may be disposed between the first input shaft INPUT1 and the output shaft OUTPUT, so the first input shaft INPUT1 and the output shaft OUTPUT can be directly coupled by the center coupling device SC and power transmission efficiency can be improved accordingly. The center coupling device may be a synchro-mesh type synchronizer.

Figure 7:
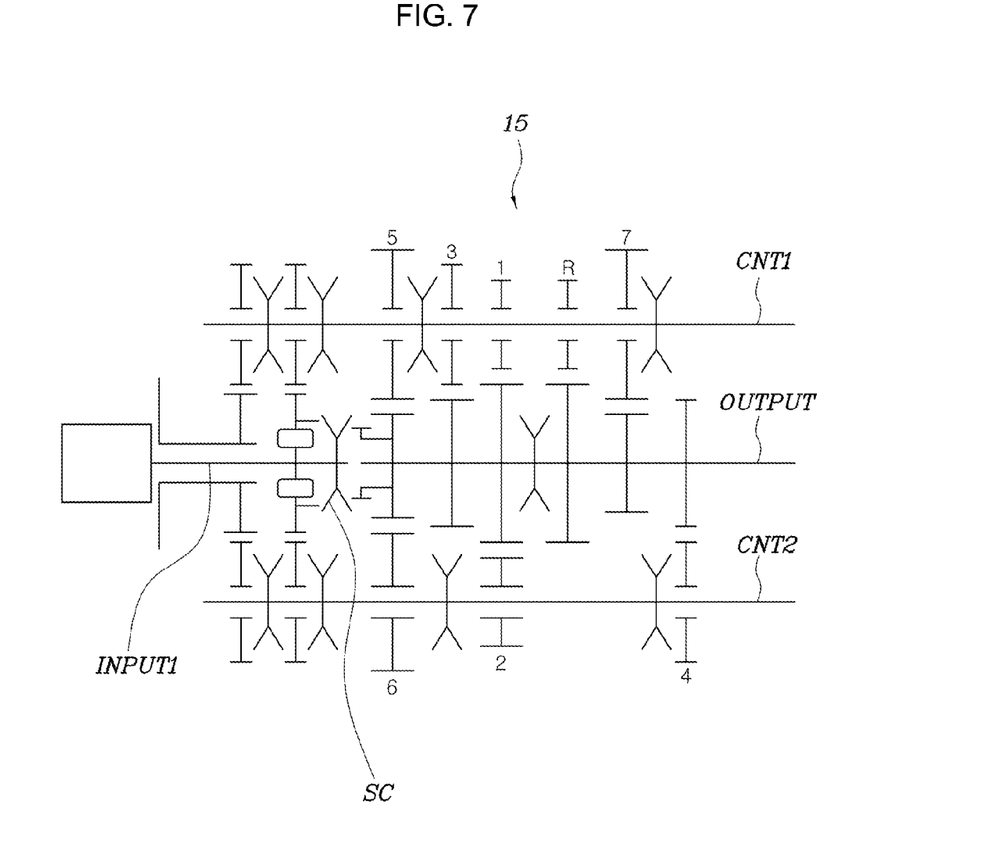
FIG. 7 is a diagram illustrating the entire configuration of an exemplary transmission for a vehicle having another arrangement of gears in a shifting device according to the present invention.

Further, according to another arrangement of a shifting mechanism 15 shown in FIG. 7, as described above, the arrangement can be achieved by changing the arrangement of the shift gears of the shifting mechanism shown in FIG. 1.

For example, not only odd-numbered-range input shift gears, but some (R-range) of even-numbered-range input shift gears may be disposed on the first countershaft CNT1 and the synchronizers on the first countershaft CNT1 or the second countershaft CNT2 may be moved to the output shaft OUTPUT.

The operation and effect of the present invention are described hereafter.

A process of shifting from the N-range (neutral) to the 1-range is described with reference to FIGS. 2A to 2D.

Figure 2A:
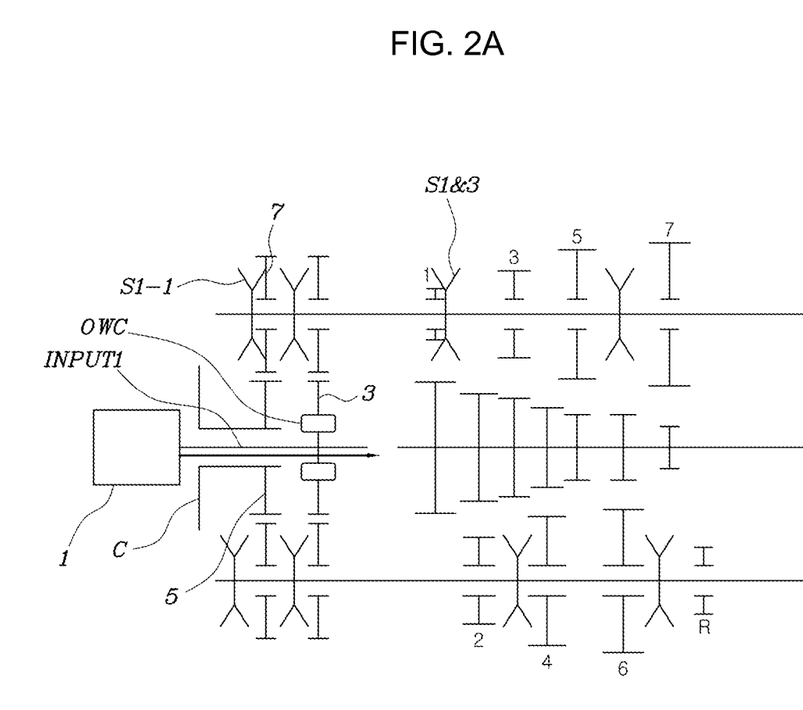
FIG. 2A, FIG. 2B, FIG. 2C, and FIG. 2D are diagrams illustrating a process of shifting from an N-range to a 1-range by an exemplary transmission for a vehicle according to the present invention.

The first input shaft INPUT1 is directly connected to the engine 1 when the vehicle is started, so the first input transfer gear 3 is rotated with the first input shaft INPUT1 by the one-way clutch OWC.

In this state, all the coupling devices and synchronizers in the transmission are positioned for the neutral state, so load is not applied to the operation of the engine 1 regardless of whether the clutch C is engaged or not.

When shifting to the 1-range is started, as shown in FIG. 2A, before the clutch C is engaged, the first pre-mesh gear 7 is coupled to the first countershaft CNT1 by the first-first coupling device S1-1 and the input 1-range shift gear is coupled to the first countershaft CNT1 by the 1 & 3-range synchronizer S1 & 3.

In this state, when the clutch C is engaged, torque from the engine 1 starts to be transmitted through the second input shaft INPUT2 too, so the torque is transmitted to the first countershaft CNT1 through the second input transfer gear 5 and the first pre-mesh gear 7 and the vehicle can run in the 1-range by the pair of the 1-range shift gears on the first countershaft CNT1 and the output shaft OUTPUT.

Figure 2B:
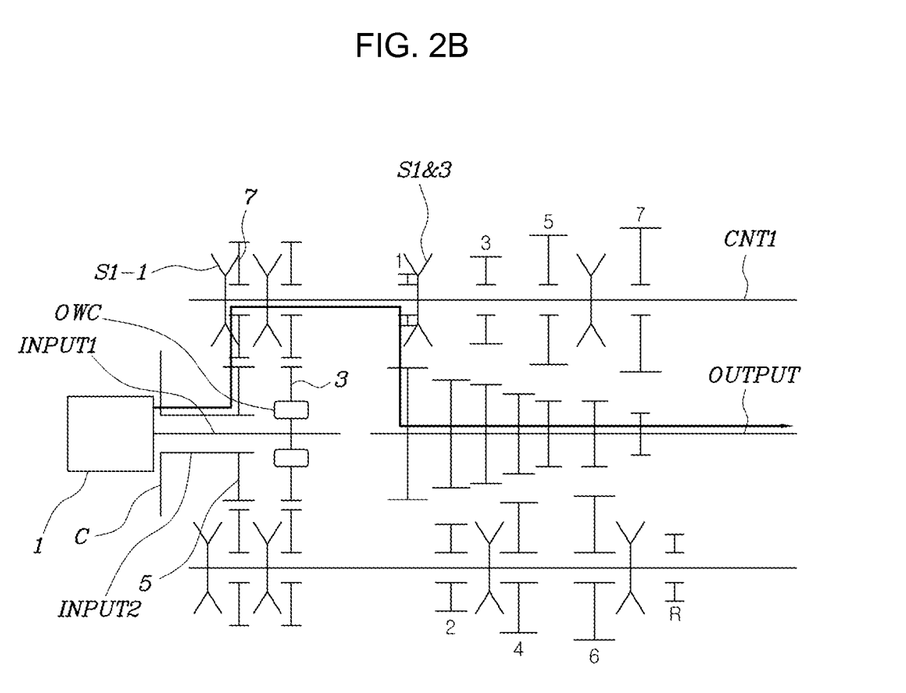
Figure 2C:
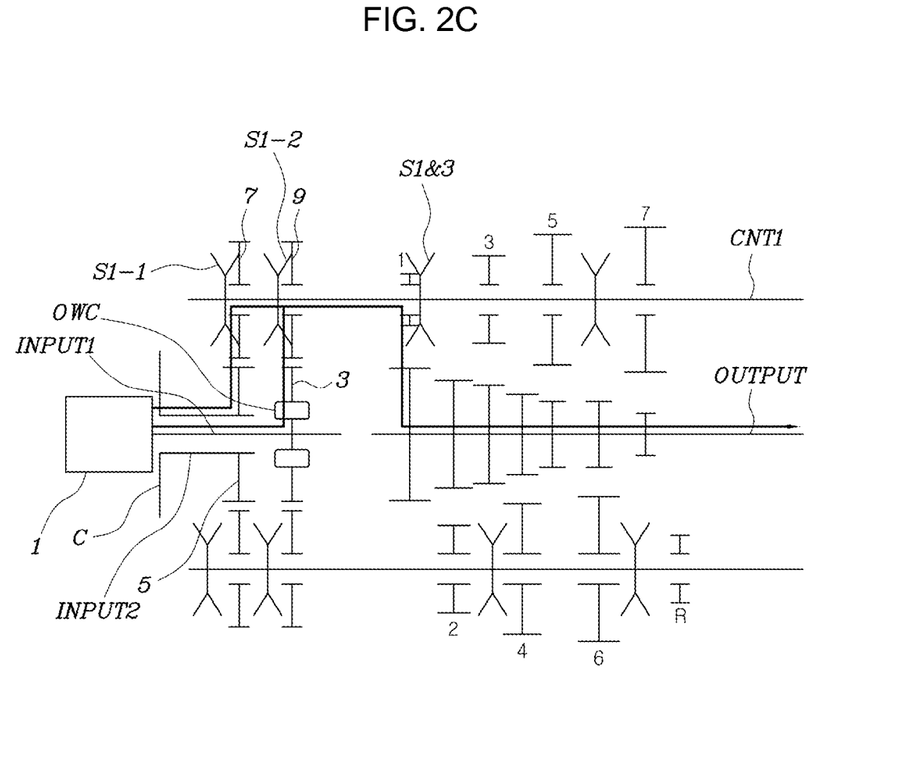

Thereafter, the first synchro-mesh gear 9 is coupled to the first countershaft CNT1 by the first-second coupling device S1-2.

That is, when the vehicle runs in the 1-range, as in FIG. 2B, the first input shaft INPUT1 and the second input shaft INPUT2 rotate at the same speed and the first pre-mesh gear 7 and the first synchro-mesh gear 9 engaged with the first input transfer gear 3 and the second input transfer gear 5 make the same gear ratio. Accordingly, since the first pre-mesh gear 7 and the first synchro-mesh gear 9 rotate with the rotational speeds synchronized, the first-second coupling device S1-2 can be safely coupled to the first synchro-mesh gear 9 without damage to the first synchro-mesh gear 9.

Figure 2D:
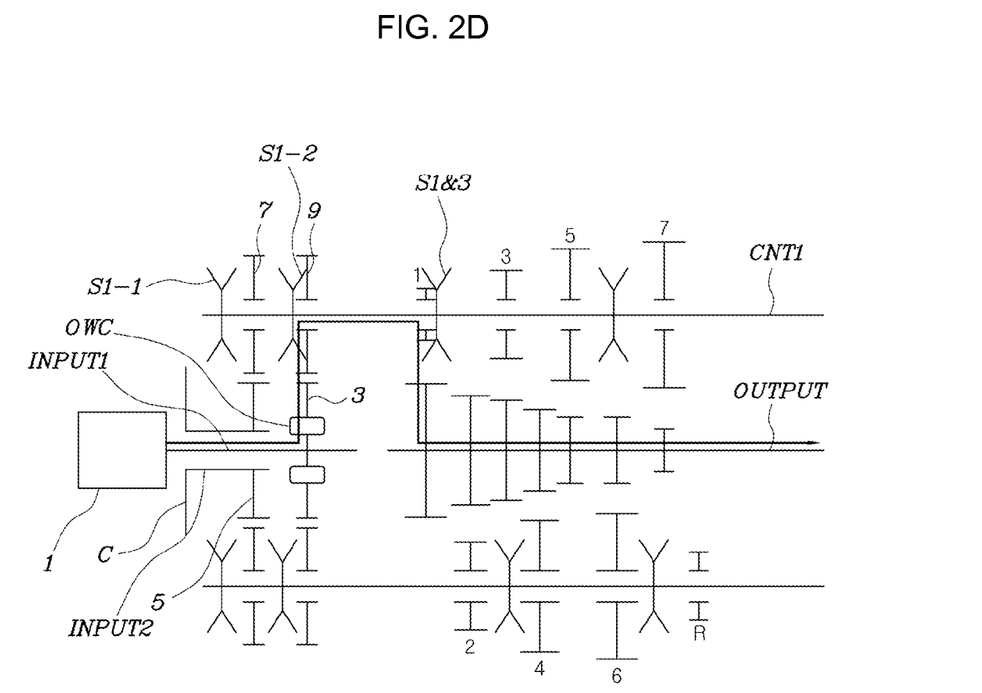

Next, the first-first coupling device S1-1 is decoupled from the first pre-mesh gear 7, as in FIG. 2D, but the first input shaft INPUT1 is directly connected to the engine 1 even though the first pre-mesh gear 7 is decoupled, so the torque from the engine keeps being transmitted to the output shaft OUTPUT through the first input transfer gear 3 and the first synchro-mesh gear 9 and the vehicle can keep run in the 1-range.

Thereafter, though not shown in the figures, torque from the engine 1 keeps being transmitted to the output shaft OUTPUT through the first input shaft INPUT1 directly connected to the engine 1 even if the clutch C is disengaged, so the 1-range can be maintained.

Next, a process of shifting from the 1-range to the 2-range is described with reference to FIGS. 3A to 3D.

Figure 3A:
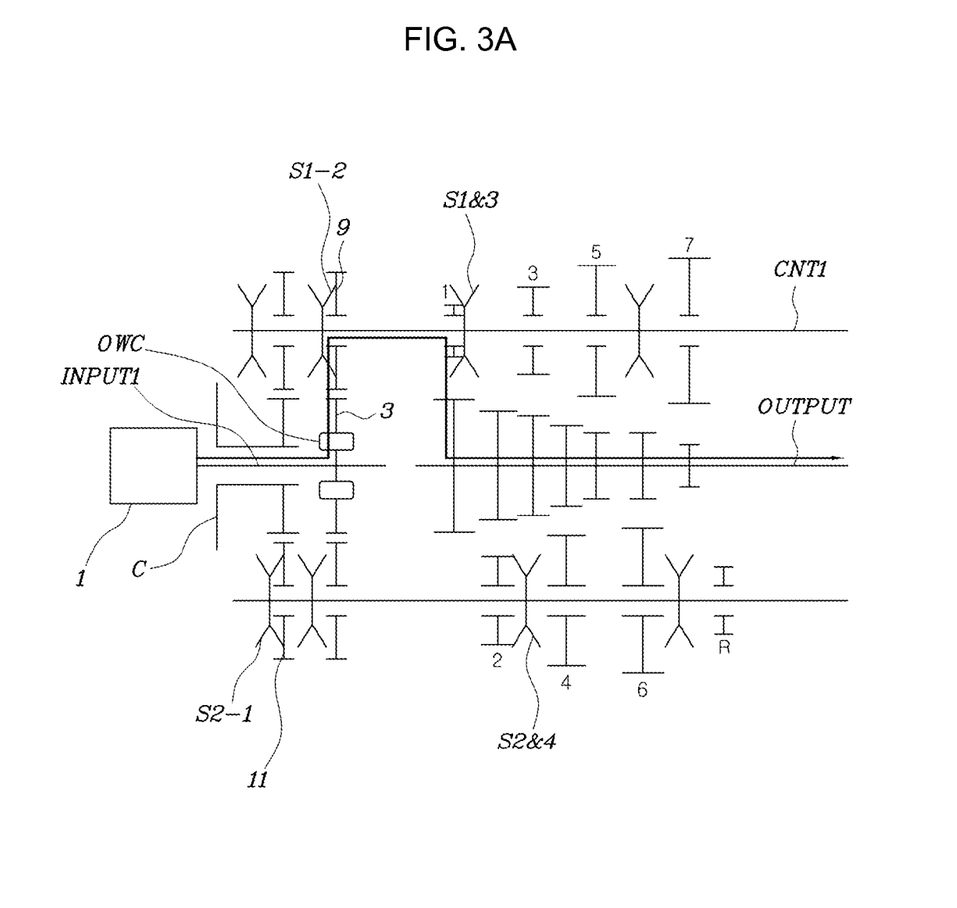
FIG. 3A, FIG. 3B, FIG. 3C, and FIG. 3D are diagrams illustrating a process of shifting from the 1-range to a 2-range by an exemplary transmission for a vehicle according to the present invention.

When shifting from the 1-range to the 2-range is started, as shown in FIG. 3A, with the clutch C disengaged, the second pre-mesh gear 11 is coupled to the second countershaft CNT2 by the second-first coupling device S2-1 and the input 2-range shift gear is coupled to the second countershaft CNT2 by the 2 & 4-range synchronizer S2 & 4.

In this state, when the clutch C is engaged, torque from the engine 1 starts to be transmitted through the second input shaft INPUT2 too, so the torque is transmitted to the second countershaft CNT2 through the second input transfer gear 5 and the second pre-mesh gear 11 and the vehicle can run in the second range by the pair of the 2-range shift gears on the second countershaft CNT2 and the output shaft OUTPUT.

That is, the pair of 1-range shift gears are engaged together with the first synchro-mesh gear 9 and the vehicle runs in the 1-range, before the clutch C is engaged, but a relative rotation action in which the first input transfer gear 3 intends to rotate at a higher speed than the first input shaft INPUT1 by the difference in gear ratio between the pair of 2-range shift gears and the pair of 1-range shift gears when the clutch C is engaged and the relative rotation action is allowed by the one-way clutch OWC.

Accordingly, the flow of torque transmitted to the first countershaft CNT1 through the first input transfer gear 3 when the vehicle runs in the 1-range smoothly changes to the second countershaft CNT2 through the second input transfer gear 5 by slip control of the clutch C and the relative rotation action allowed by the one-way clutch OWC in the process of shifting to the 2-range, so deterioration of shifting ability such as backward pulling of a vehicle in shifting is prevented.

Figure 3B:
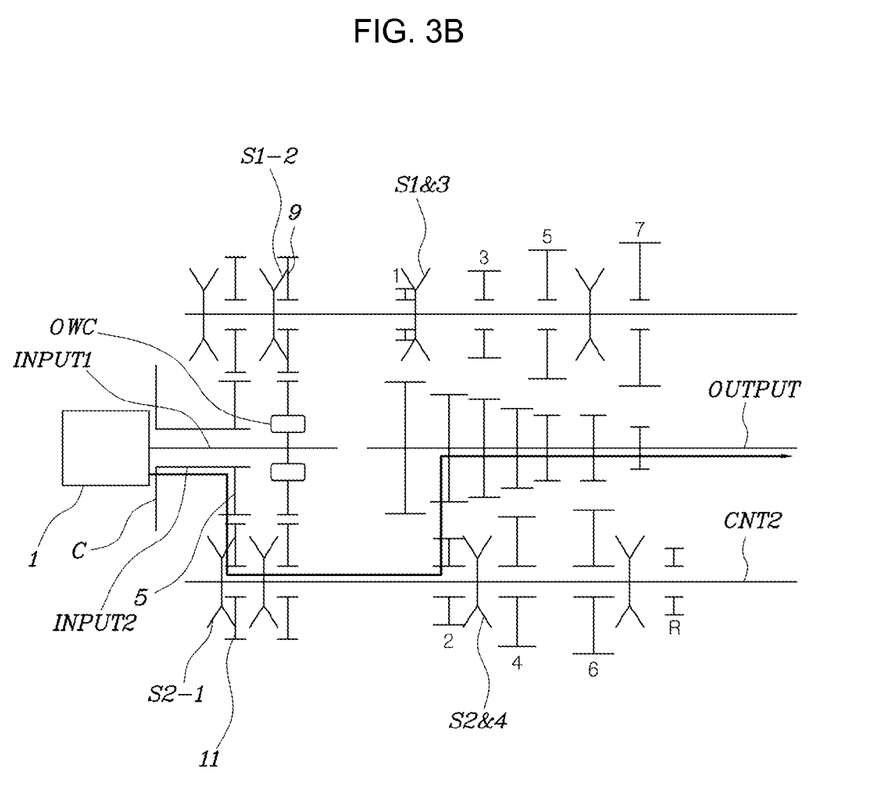
Figure 3C:
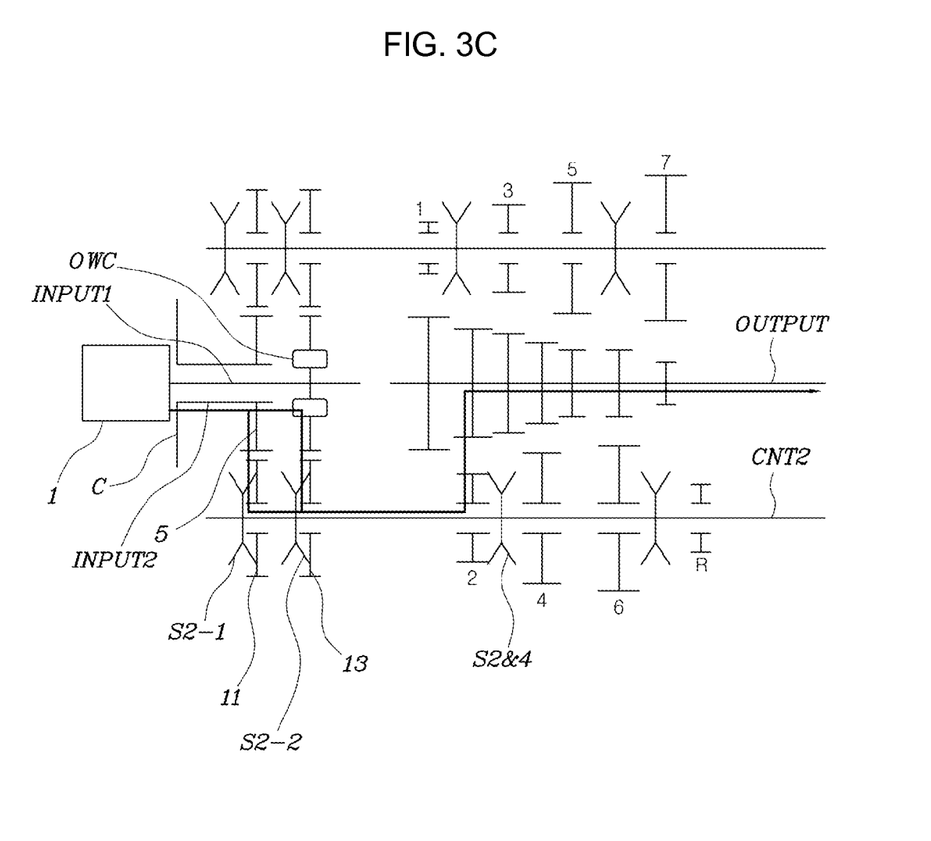

Thereafter, the second synchro-mesh gear 13 is coupled to the second countershaft CNT2 by the second-second coupling device S2-2.

That is, when the vehicle runs in the 2-range, as in FIG. 3B, the first input shaft INPUT1 and the second input shaft INPUT2 rotate at the same speed and the gear ratios between the second pre-mesh gear 11 and the second synchro-mesh gear 13 engaged with the first input transfer gear 3 and the second input transfer gear 5 make the same gear ratio. Accordingly, since the second pre-mesh gear 11 and the second synchro-mesh gear 13 rotate with the rotational speeds synchronized, the second-second coupling device S2-2 can be safely coupled to the second synchro-mesh gear 13 without damage to the second synchro-mesh gear 13.

Figure 3D:
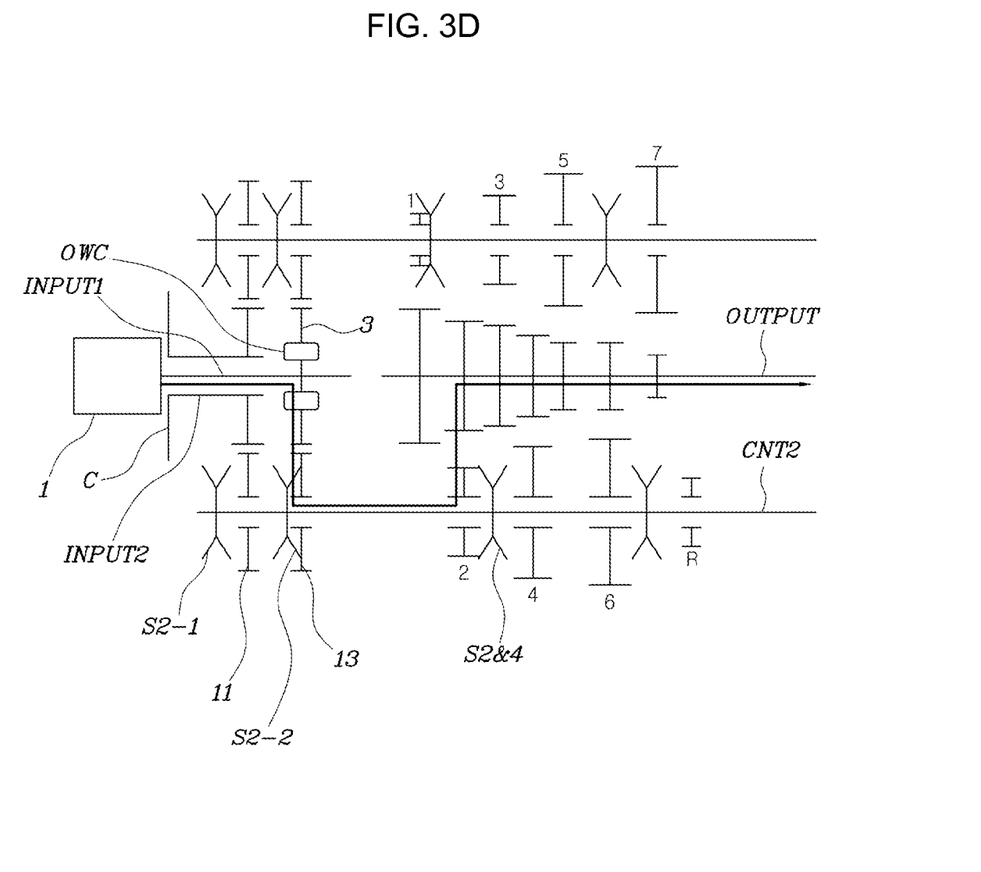

Next, the second-first coupling device S2-1 is decoupled from the second pre-mesh gear 11, as in FIG. 3D, but the first input shaft INPUT1 is directly connected to the engine 2 even though the second pre-mesh gear 11 is decoupled, so the torque from the engine keeps being transmitted to the output shaft OUTPUT through the first input transfer gear 3 and the second synchro-mesh gear 13 and the vehicle can keep running in the second range.

Thereafter, though not shown in the figures, torque keeps being transmitted to the output shaft OUTPUT through the first input shaft INPUT1 directly connected to the engine 1 even if the clutch C is disengaged, so the 2-range can be maintained.

Further, the other ranges can be achieved in the processes of shifting described above.

As described above, according to the present invention, the flow of torque transmitted through the first input transfer gear 3 is smoothly changed to the desired pair of shift gears through the second input transfer gear 5 by slip control of the clutch C and the relative rotation action allowed by the one-way clutch OWC in the process of shifting to the desired range, so deterioration of shifting ability such as backward pulling of a vehicle in shifting is prevented.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle, comprising:
   a first input shaft continuously receiving torque from a power source and having a first input transfer gear thereon;
   a second input shaft selectively receiving torque from the power source through a clutch and having a second input transfer gear thereon;
   a coupling member allowing or restricting rotation of the first input transfer gear relative to the first input shaft, using a difference in rotational speed between the first input shaft and the first input transfer gear;
   a first countershaft and a second countershaft each having an output transfer gear to be engaged with the first input transfer gear and the second input transfer gear; and
   coupling devices selectively coupling the output transfer gears to corresponding countershafts and allowing torque from the power source to be transmitted to a desired shift gear by coupling output transfer gears connected to the desired shift gear in the output transfer gears to a corresponding countershaft in advance or after synchronization in shifting,
   wherein the coupling devices are disposed between the output transfer gears.

2. The transmission of claim 1, wherein the second input shaft is a hollow shaft and the first input shaft is inserted in the second input shaft.

3. The transmission of claim 1, wherein the coupling member comprises a one-way clutch.

4. The transmission of claim 3, wherein the one-way clutch is disposed between the first input transfer gear and the first input shaft.

5. The transmission of claim 1, wherein the output transfer gears include:
   a first pre-mesh gear relatively rotatably disposed on the first countershaft and engaged with the second input transfer gear;
   a first synchro-mesh gear relatively rotatably disposed on the first countershaft and engaged with the first input transfer gear;
   a second pre-mesh gear relatively rotatably disposed on the second countershaft and engaged with the second input transfer gear; and
   a second synchro-mesh gear relatively rotatably disposed on the second countershaft and engaged with the first input transfer gear.

6. The transmission of claim 1, wherein gear ratios between the first and second input transfer gears and the output transfer gears on each of the countershafts are the same.

7. The transmission of claim 1, wherein the coupling devices include:
   a first coupling device selectively coupling the output transfer gears on the first countershaft to the first countershaft; and
   a second coupling device selectively coupling the output transfer gears on the second countershaft to the second countershaft.

8. The transmission of claim 7, wherein the first coupling device and the second coupling device are provided individually for the output transfer gears.

9. The transmission of claim 7, wherein at least one of the first coupling device and the second coupling device is disposed between the output transfer gears.

10. The transmission of claim 1, further comprising:
    an output shaft disposed in parallel with the first countershaft and the second countershaft; and
    a shifting mechanism including a plurality of pairs of shift gears with different transmission gear ratios on the first countershaft, the second countershaft, and the output shaft, and configured to change and output torque from the power source through the output shaft by selecting pairs of gears corresponding to speeds of a vehicle, using a synchronizer.

11. The transmission of claim 10, wherein the first input shaft, the second input shaft, and the output shaft are coaxially arranged.

12. The transmission of claim 10, wherein input shift gears for odd-numbered ranges are disposed on the first countershaft,
    remaining shift gears except for the input shift gears on the first countershaft are disposed on the second countershaft, and
    output shift gears that are paired with the input shift gears are disposed on the output shaft.

13. The transmission of claim 10, wherein a center coupling device for coupling is disposed between the first input shaft and the output shaft.

* * * * *